Patented Feb. 6, 1951

2,540,131

UNITED STATES PATENT OFFICE 2,540,131

WATER-DISPERSIBLE PHENOTHIAZINE POWDERS

Clarence A. Littler, Maple Heights, Ohio, assignor to E. I. du Pont de Nemours & Company, Wilmington, Del., a corporation of Delaware No Drawing. Application February 21, 1945, Serial No. 579,166

8 Claims. (Cl. 167—53)

This invention relates to compositions of matter readily dispersible in water and is more particularly directed to compositions in the form of powdered mixtures, the compositions comprising a substance difficult to wet with water, particularly phenothiazine, and a minor proportion of a wetting promoter having the formula

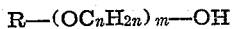

$$R\text{—}(OC_nH_{2n})_m\text{—}OH$$

where R stands for an organic radical containing from 4 to 18 carbon atoms and selected from the group consisting of alkyl, acyl, phenyl, and naphthyl radicals, $m$ is from 1 to 20, $n$ is from 2 to 21, the sum of $m+n$ is not more than 22, and there is only one hydroxyl in the molecule.

The problem of dispersing finely divided, hydrophobic substances into water is frequently encountered, and various wetting and suspending agents to aid in this operation have been proposed. Most of these agents are ionic in character, that is, when dissolved in water they form positively and negatively charged ions. If the negatively charged ion is responsible for the effectiveness of the wetting or suspending agent the agent is said to be anionic and, conversely, agents in which the positively charged ion is effective are called cationic. In many systems it is undesirable to have present either positive or negative ions. The present invention pertains to non-ionic agents, that is, agents which upon addition to water form neither positive nor negative ions.

Many of the most effective wetting and suspending agents hitherto known contribute to the formation of foam when the water in which they are dissolved is agitated in air. Often this is considered an advantage. With soap, for instance, the ability to form a thick suds in water is frequently used as a measure of detergent power.

There are, however, many situations in which foam formation is highly objectionable. For instance, where aqueous suspensions containing wetting agents are kept agitated while they are being used, foam formation may result in non-uniform composition throughout the mixture, may cause vapor locking of pumps, may require use of larger tanks in order to accommodate the foam, and in various other ways may contribute to the difficulty of using the suspensions. Thus, in applying an aqueous suspension of an agricultural insecticide or fungicide the formation of foam may cause many highly objectionable difficulties. It is an object of the present invention to provide agents which do not contribute to foam formation in water.

Phenothiazine in particular is an example of an agent which is highly effective for the control of insect pests but which is difficult to wet. For instance, it has been used to control codling moth on apples, and as an anthelmintic for controlling worms in sheep, cattle, horses, and other animals. In such uses the phenothiazine is usually applied in the form of an aqueous suspension. In using phenothiazine as an anthelmintic it is common practice to administer it internally as a "drench," that is, as a relatively concentrated aqueous suspension. To keep the amount of liquid so injected to a minimum it is necessary that the suspension contain a relatively large proportion of active ingredient. Thus it is desirable that anthelmintic drenches should contain about 40% or more of phenothiazine.

Phenothiazine is hydrophobic in character, so that when powdered phenothiazine is added to water serious difficulty is encountered in causing the phenothiazine to be wetted by the water. This difficulty is aggravated by the necessity of procuring a high concentration of phenothiazine in the suspensions to be used as drenches. The wetting agents heretofore commonly used, as for instance, to aid in the wetting of textiles, do not offer a solution to the problem because, while they may improve the wettability of the phenothiazine, their use leads to foam formation in the drench. These difficulties are all the more perplexing because the mixing equipment of the average phenothiazine user may be extremely limited.

Now according to the present invention it has been found that compositions which are easily wetted by water and do not cause excessive foam when agitated in water are produced by intimately mixing with a hydrophobic substance a minor proportion of a non-ionic wetting promoter having the formula $R\text{—}(OC_nH_{2n})_m\text{—}OH$, where R stands for an organic radical containing from 4 to 18 carbon atoms and is selected from the group consisting of alkyl, acyl, phenyl, and naphthyl radicals, $m$ is from 1 to 20, $n$ is from 2 to 21, the sum of $m+n$ is not more than 22, and there is only one hydroxyl in the molecule.

The invention is applied with particular advantage when the hydrophobic substance is phenothiazine, and in this case the invention provides powdered compositions ideally adapted for the preparation of aqueous anthelmintic drenches.

The agents which according to the present invention have been found to facilitate the wetting of hydrophobic substances with water are herein referred to as "wetting promoters" to distinguish them from the type of substances known as wetting agents. Wetting agents, such as have hitherto been used in the textile industry, ordinarily are water-soluble and cause foaming when so dissolved. In contrast the wetting promoters of this invention may or may not dissolve in water, but if they do dissolve they are non-ionic and substantially non-foaming.

The compositions of this invention are in the form of powdered, intimate mixtures. In general it will be found that the more finely divided the powder is, the more permanent and uniform will be the aqueous suspension produced therefrom. The components may be mixed and the mixture subjected to grinding, as in a ball mill, or the components may be independently reduced to a fine state of subdivision and then mixed by any suitable means.

The hydrophobic substance which is mixed with the promoter may be any substance which is difficult to wet with water. Elemental sulfur, for instance, is commonly used as an agricultural fungicide and is applied to foliage as an aqueous suspension. It is difficult to wet, however, and ordinary ionic wetting agents are considered deleterious in the spray. When sulfur is rendered wettable by the inclusion of a promoter according to this invention an excellent agricultural spray may be obtained. Similarly, various insecticides and fungicides, pigments, coating agents, and similar materials having hydrophobic character may be made more readily wettable.

Especial advantages are realized when phenothiazine is made more readily wettable according to this invention. The phenothiazine may contain from a fraction of a per cent up to several per cent by weight of diphenylamine. The advantages of the invention will be most apparent when the diphenylamine content is relatively large as, for instance, 5%, but significant advantages are obtained when the diphenylamine content is as little as 0.2% by weight based on the phenothiazine. Ordinarily the diphenylamine content will not exceed about 2% since the diphenylamine contributes nothing to the effectiveness of the compound, is a relatively expensive impurity, and is readily convertible to phenothiazine by heating with sulfur in the presence of a catalyst.

In the formula, $R-(OC_nH_{2n})_m-OH$, to which the wetting promoters respond, R stands for an organic radical containing from 4 to 18 carbon atoms and is selected from the group consisting of alkyl, acyl, phenyl, and naphthyl radicals. The organic radical may be cyclic or acyclic, straight or branch chain, aliphatic or aromatic, and saturated or unsaturated, provided the total number of carbon atoms in the group is from 4 to 18.

The hydrocarbon radical R is selected from the group consisting of alkyl, acyl, phenyl, and naphthyl radicals. Alkyl radicals will be understood to include alkaryl groups, that is, alkyl groups having an aryl substituent such as a phenyl group. Acyl groups will be understood to include all groups having the formula

wherein $R_1$ may be either an alkyl or an aryl group.

In the formula $m$ may be from 1 to 20, and $n$ from 2 to 21. More particularly, outstanding results have been obtained, especially with phenothiazine, when $m$ is from 1 to 20 and $n$ is 2 or 3. It will be understood that for any given compound $m$ and $n$ are integers but that mixtures of members of a homologous series may be used so that the average values for $m$ and $n$ may be fractional.

The amount of a wetting promoter to use with a hydrophobic substance according to this invention should be a minor proportion of the weight of hydrophobic material. In some instances the proportion may be in the order of 5 per cent, but ordinarily, excellent results will be obtained using about from 0.1 to 1.0 per cent.

When the compositions of this invention are to be used in the preparation of anthelmintic drenches, results of outstanding merit may be obtained by including a minor proportion of a non-amylaceous high molecular weight, water-soluble, polyhydroxylic polymer. Such a polymer should contain a multiplicity of hydroxyl groups attached to carbon atoms. The polymers should be water-soluble and they should have high molecular weight, that is a molecular weight substantially in excess of 5000, and they should be non-ionic. Representative of the polymers which may be so used are methyl cellulose and polyvinyl alcohol. The methyl cellulose should not, of course, be so highly methylated that no hydroxyl groups remain.

The polyvinyl alcohol, which represents a preferred agent of the invention, may be such as is obtained by the hydrolysis of polyvinyl acetate. To gain the necessary water solubility the degree of hydrolysis of the acetate should preferably be greater than 50% but it will be understood that complete hydrolysis is not essential and that there may be present in the polyvinyl alcohol residual acetate groups, say to the extent of 20% of the original number of such groups. The degree of polymerization of the polyvinyl alcohol should not be so great as to interfere with the cold water solubility of the material. A product prepared by hydrolyzing polyvinyl acetate to the extent of 90%, and having an average molecular weight of about 15,000 may be used to especial advantage.

The polyhydroxylic polymer should constitute a minor proportion of the total phenothiazine composition. More particularly it should be present in the proportion of about from 0.25 to 1.0%. Especially good results are obtained using about 0.4%.

In a preferred embodiment of the invention there may be included a stabilizer such as algin. Such a stabilizer should be present as a minor proportion of the total composition, excellent results being derived from using from 0.1 to 1.0%. In a particularly preferred composition 0.25% of algin may be used.

When the compositions of this invention are to be used with waters which are very hard, that is, containing more than about 300 parts per million of hardness, important advantages may be derived by the inclusion of a minor proportion of tetrasodium pyrophosphate. When used the pyrophosphate may constitute from about 0.05% to 1.0% of the composition.

The compositions of this invention may be used for making aqueous suspensions. More particularly, when they contain phenothiazine they may be used for making anthelmintic drenches containing substantial proportions, say 40% or more, of phenothiazine in water. Where the compositions are intended for ultimate internal use in warm blooded animals, caution should of course be exercised to be sure that the agents employed are non-toxic to such animals in the dosage ultimately involved.

The nature of this invention will be better understood by reference to the following illustrative examples:

Example I

A composition of this invention was made up by intimately mixing, through grinding in a ball mill, the following constituents in the indicated proporton by weight.

| | Percent |
|---|---|
| Phenothiazine, containing 0.45% diphenylamine | 98.2 |
| Propylene glycol monolaurate | 0.8 |

The resultant product was a powder which was found to be readily wettable in water to the extent of 40% by weight and ideally adapted for use as an anthelmintic drench.

In the examples that follow powdered, intimate mixtures were made up by grinding the indicated ingredients together, the percentages shown being by weight, and in each case the resultant product was found to be readily wetted by water without objectionable foam formation.

Example II

| | Percent |
|---|---|
| Phenothiazine containing 0.45% diphenylamine | 98.5 |
| Diethylene glycol monooleate | 0.8 |

Example III

| | Percent |
|---|---|
| Phenothiazine containing 0.45% diphenylamine | 98.6 |
| Monobenzyl ether of heptaethylene glycol, a benzyl-alcohol-ethylene oxide reaction product containing a polyethylene oxide unit of 7 ethylene oxide radicals combined with 1 benzyl alcohol radical | 0.5 |
| Cold water soluble, low viscosity type polyvinyl alcohol | 0.2 |

Example IV

| | Percent |
|---|---|
| Phenothiazine containing 0.45% diphenylamine | 99.0 |
| Nonaethylene glycol monolaurate | 1.0 |

Example V

| | Percent |
|---|---|
| Phenothiazine containing 0.45% diphenylamine | 99.0 |
| Monobetanaphthol ether of pentaethylene glycol, a betanaphthol-ethylene oxide reaction product containing a polyethylene oxide unit of 5 ethylene oxide radicals combined with 1 betanaphthol radical | 1.0 |

Example VI

| | Percent |
|---|---|
| Phenothiazine containing 0.45% diphenylamine | 99.0 |
| Mono-octadecyl ether of nonaethylene glycol, an octadecyl alcohol-ethylene oxide reaction product containing a polyethylene oxide unit of 9 ethylene oxide radicals combined with 1 octadecyl alcohol radical | 1.0 |

Example VII

| | Percent |
|---|---|
| Phenothiazine containing 0.45% diphenylamine | 98.6 |
| Monophenyl ether of ethylene glycol | 1.5 |
| Cold water soluble, low viscosity type polyvinyl alcohol | 0.4 |

Example VIII

| | Percent |
|---|---|
| Phenothiazine containing 0.45% diphenylamine | 98.6 |
| Monobenzyl ether of ethylene glycol | 1.0 |
| Cold water soluble, low viscosity type polyvinyl alcohol | 0.4 |

Example IX

| | Percent |
|---|---|
| Phenothiazine containing 0.45% diphenylamine | 98.6 |
| Monobutyl ether of diethylene glycol | 1.0 |
| Cold water soluble, low viscosity type polyvinyl alcohol | 0.4 |

Example X

| | Percent |
|---|---|
| Phenothiazine containing 0.45% diphenylamine | 98.6 |
| Monobutyl ether of ethylene glycol | 1.0 |
| Cold water soluble, low viscosity type polyvinyl alcohol (87.7% hydrolyzed polyvinyl acetate, viscosity=5 cp. at 20° C.) in 4% solution | 0.4 |

Example XI

| | Percent |
|---|---|
| Phenothiazine containing .45% diphenylamine | 99.0 |
| Mono lauric acid ester of 2 methyl 2,4 pentanediol | 1.0 |

Example XII

| | Percent |
|---|---|
| Phenothiazine containing .45% diphenylamine | 99.0 |
| Monolauric acid ester of alpha, omega octadecane diol | 1.0 |

It will be seen that the wetting promoters of the above examples all respond to the formula $R-(OC_nH_{2n})_m-OH$. Thus, for propylene glycol monolaurate of Example I, R is an acyl group having 12 carbon atoms, $n=3$, $m=1$, $m+n=4$, and there is only one hydroxyl in the molecule. For the diethylene glycol monooleate of Example II, R is an acyl group having 18 carbon atoms (one unsaturated linkage), $n=2$, $m=2$, $m+n=4$, and the molecule contains only one hydroxyl. Similarly, in Example III, R is an alkyl group (more particularly, alk-aryl) containing 7 carbon atoms, $n=2$, $m=7$, $m+n=9$, compound is monohydroxy. In Example IV, R=acyl group with 12 carbons, $n=2$, $m=9$, $m+n=11$. In Example V, R=naphthyl group with 10 carbons, $n=2$, $m=5$, $m+n=7$. In Example VI, R=alkyl group with 18 carbons, $n=2$, $m=9$, $m+n=11$. In example VII, R=phenyl group with 6 carbon atoms, $n=2$, $m=1$, $m+n=3$. In Example VIII, R=alkyl (i. e., alkaryl) group, $n=2$, $m=1$, $m+n=3$. In Example IX, R=alkyl group with 4 carbons, $n=2$, $m=2$, $m+n=4$. In Example X, R=alkyl group with 4 carbons, $n=2$, $m=1$, $m+n=3$. In Example XI, R=acyl group with 12 carbons, $n=5$, $m=1$, $m+n=6$. In Example XII, R=acyl group with 12 carbons, $n=18$, $m=1$, $m+n=19$.

While in the foregoing description of the invention there have been shown certain specific compositions it will be understood that without departing from the spirit of the invention one skilled in the art may produce numerous compositions.

I claim:

1. A composition in the form of a powdered, intimate mixture which is readily dispersible in water to give a non-foaming phenothiazine drench, the composition comprising phenothiazine and a minor proportion of a non-ionic wetting promoter having the formula $$R—(OC_nH_{2n})_m—OH$$

where R stands for an organic radical containing from 4 to 18 carbon atoms and is selected from the group consisting of alkyl, acyl, phenyl, and naphthyl radicals, $m$ is from 1 to 20, $n$ is from 2 to 21, the sum of $m+n$ is not more than 22, and there is only one hydroxyl in the molecule.

2. A composition in the form of a powdered, intimate mixture which is readily dispersible in water to give a non-foaming phenothiazine drench, the composition comprising phenothiazine and a minor proportion of a non-ionic wetting promoter having the formula $$R—(OC_nH_{2n})_m—OH$$

where R stands for an acyl radical containing from 4 to 18 carbon atoms, $m$ is from 1 to 20, $n$ is from 2 to 21, the sum of $m+n$ is not more than 22, and there is only one hydroxyl in the molecule.

3. A composition in the form of a powdered, intimate mixture which is readily dispersible in water to give a non-foaming phenothiazine drench, the composition comprising phenothiazine and a minor proportion of a non-ionic wetting promoter having the formula $$R—(OC_nH_{2n})_m—OH$$

where R stands for an alkyl radical containing from 4 to 18 carbon atoms, $m$ is from 1 to 20, $n$ is from 2 to 21, the sum of $m+n$ is not more than 22, and there is only one hydroxyl in the molecule.

4. A composition in the form a powdered, intimate mixture which is readily dispersible in water to give a non-foaming phenothiazine drench, the composition comprising phenothiazine and a minor proportion of a non-ionic wetting promoter having the formula $$R—(OC_nH_{2n})_m—OH$$

where R stands for a phenyl radical containing from 4 to 18 carbon atoms, $m$ is from 1 to 20, $n$ is from 2 to 21, the sum of $m+n$ is not more than 22, and there is only one hydroxyl in the molecule.

5. A composition in the form of a powdered, intimate mixture which is readily dispersible in water to give a non-foaming phenothiazine drench, the composition comprising phenothiazine and a minor proportion of a non-ionic wetting promoter having the formula $$R—(OC_nH_{2n})_m—OH$$

where R stands for a hydrocarbon acyl radical containing from 4 to 18 carbon atoms, $m$ is from 1 to 20, $n$ is from 2 to 3, the sum of $m+n$ is not more than 22, and there is only one hydroxyl in the molecule.

6. A composition in the form of a powdered, intimate mixture which is readily dispersible in water to give a non-foaming phenothiazine drench, the composition comprising phenothiazine and a minor proportion of a monopropylene glycol monoacylate.

7. A composition in the form of a powdered, intimate mixture which is readily dispersible in water to give a non-foaming phenothiazine drench, the composition comprising phenothiazine and a minor proportion of monopropylene glycol monolaurate.

8. A composition in the form of a powdered, intimate mixture which is readily dispersible in water to give a non-foaming phenolthiazine drench, the composition comprising phenothiazine and about from 0.1 to 1.0 per cent by weight, based on the phenothiazine, of monopropylene glycol monolaurate.

CLARENCE A. LITTLER.

REFERENCES CITED

The following references are of record in the file of this patent:

UNITED STATES PATENTS

| Number | Name | Date |
|---|---|---|
| 2,161,462 | Flenner | June 6, 1929 |
| 2,042,559 | Putt | May 26, 1936 |
| 2,098,836 | Ressler | Nov. 9, 1937 |
| 2,217,566 | Smith | Oct. 8, 1940 |
| 2,236,545 | Maxwell | Apr. 1, 1941 |
| 2,262,454 | Flenner | Nov. 11, 1941 |
| 2,294,888 | Austin | Sept. 8, 1942 |
| 2,407,486 | Flenner | Sept. 10, 1946 |
| 2,495,270 | Littler | Jan. 24, 1950 |

OTHER REFERENCES

Chemicals published by Glyco Products, Brooklyn, N. Y., 1944 ed., pages 8, 9 and 11. (Copy in Div. 64.)

Journal Econ. Ent., volume 32, No. 5, October 1939, pages 704 and 705, by Bruce. (Copy in Div. 63.)

Goldsmith: "Non-Ionic Surface Active Agents," Chemical Industries, March 1943, pp. 326–328. (J. in Library of National Bureau Stnds.)